March 3, 1970            J. L. MEHARRY            3,498,483
COMBINATION AUGER ARRANGEMENT AND GRAVITY BED
Filed Dec. 26, 1967            2 Sheets-Sheet 1
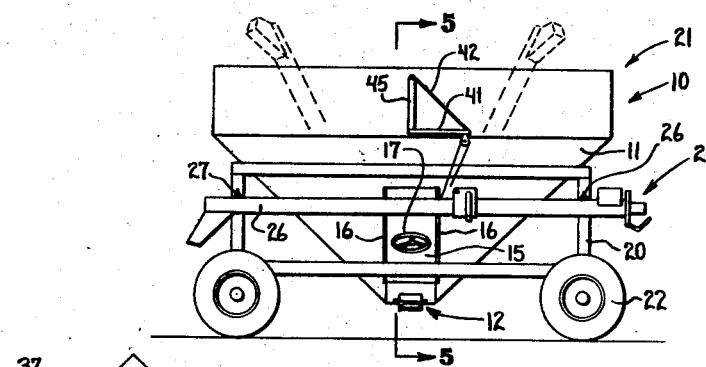
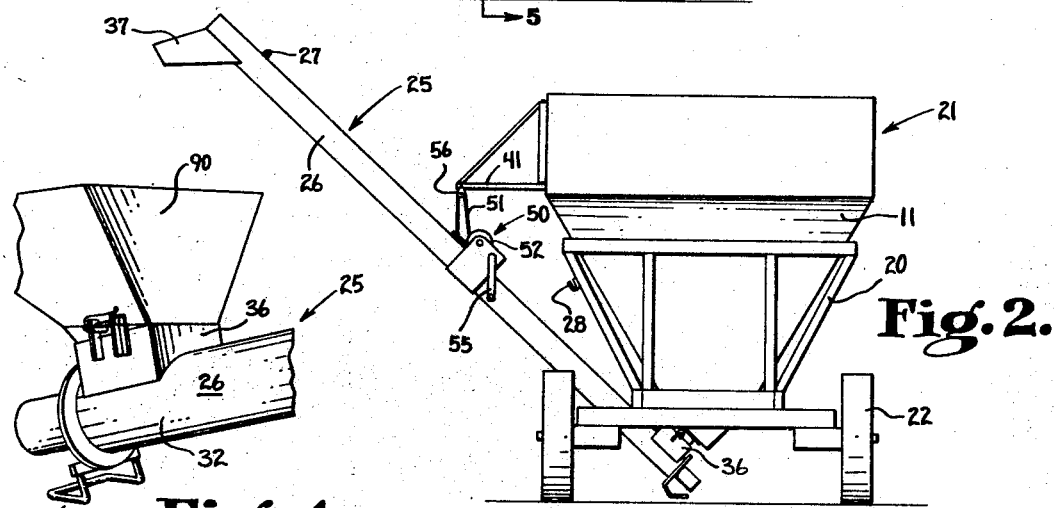
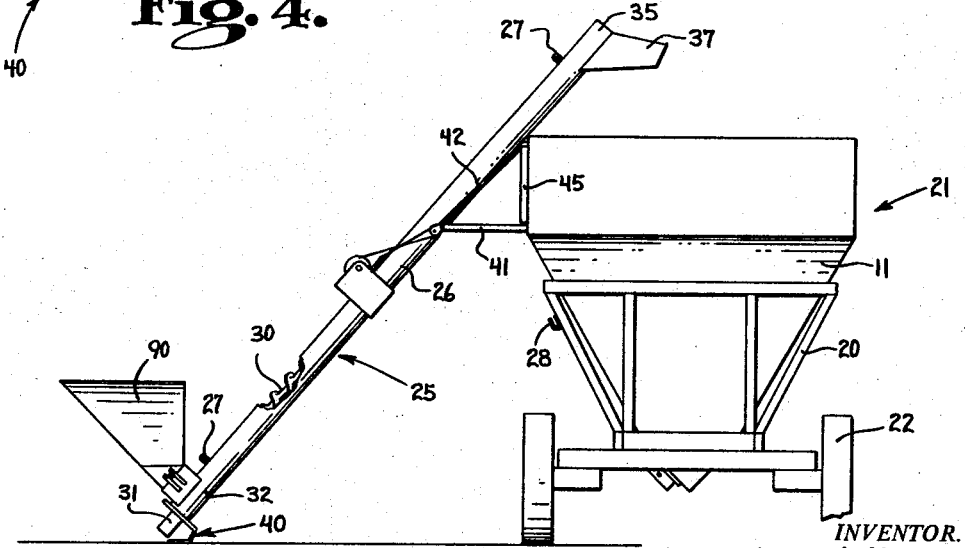
INVENTOR.
JAMES L. MEHARRY
BY
Woodard, Weikart, Emhardt & Naughton
Attorneys INVENTOR.
JAMES L. MEHARRY
BY
Woodard, Weikart, Emhardt & Naughton
Attorneys United States Patent Office 3,498,483
Patented Mar. 3, 1970

3,498,483
COMBINATION AUGER ARRANGEMENT AND GRAVITY BED
James L. Meharry, R.R. 1, Wingate, Ind. 47994
Filed Dec. 26, 1967, Ser. No. 693,527
Int. Cl. B60p 1/40
U.S. Cl. 214—83.26      6 Claims

ABSTRACT OF THE DISCLOSURE

A gravity bed vehicle having an auger arrangement mounted thereon in a swinging hanging manner by means of a horizontally pivotal arm and a line secured to the arm and to the auger arrangement centrally thereof. The vehicle can be discharged by connecting the auger arrangement to the lower end of the vehicle or can be filled by placing the discharged end of the auger arrangement over the vehicle.

BACKGROUND OF THE INVENTION

Field of the invention

This invention relates to a gravity bed vehicle incorporating an auger.

Description of the Prior Art

It is desirable that gravity bed vehicles such as those used in moving granular fertilizer, grain and the like from place to place be provided with a relatively long auger arrangement for transporting the grain from the bed of the vehicle to the desired location. It is difficult, however, to mount such a long auger on a gravity bed vehicle in such a way that it can be safely moved from place to place. Also certain presently available gravity bed vehicles have augers mounted thereon but the augers are limited in their use to the unloading of the vehicle.

Summary of the invention

One embodiment of the invention might include: in combination with a gravity bed vehicle, said vehicle having side walls which have a downward slope whereby grain and the like can move across said side walls by gravity, said side walls having an opening at the lower portion thereof, the improvement which comprises a tubular housing having a first end portion and a second end portion, an auger in said tubular housing, means for rotating said auger in said housing for moving grain and the like through said tubular housing from said first end portion to said second end portion, means swingingly and flexibly connecting said housing centrally of the length thereof to said gravity bed vehicle above said opening, said housing being adapted for connection at said first end portion to said vehicle at said opening for conveying grain and the like out of said gravity bed vehicle and upwardly, said housing being swingable relative to said gravity bed vehicle to a position wherein said second end portion is positioned above said vehicle for discharge into said vehicle.

One object of this invention is to provide an improved combination gravity bed vehicle auger arrangement.

Another object of this invention is to provide a combination gravity bed vehicle auger arrangement which can be easily transported from place to place.

Still another object of this invention is to provide a gravity bed vehicle incorporating an auger which can be used to load or to unload the vehicle.

Related objects and advantages will appear as the description proceeds.

BRIEF DESCRIPTION OF THE DRAWING

FIG. 1 is a side elevation of a combination auger arrangement and gravity bed vehicle embodying the present invention.

FIG. 2 is an enlarged end elevation of the gravity bed vehicle of FIG. 1.

FIG. 3 is a view similar to FIG. 2 but showing the auger arrangement in a different operating position.

FIG. 4 is an enlarged fragmentary perspective view of a portion of the structure illustrated in FIG. 3 showing a hopper in association therewith.

DESCRIPTION OF THE PREFERRED EMBODIMENT

Figure 5:
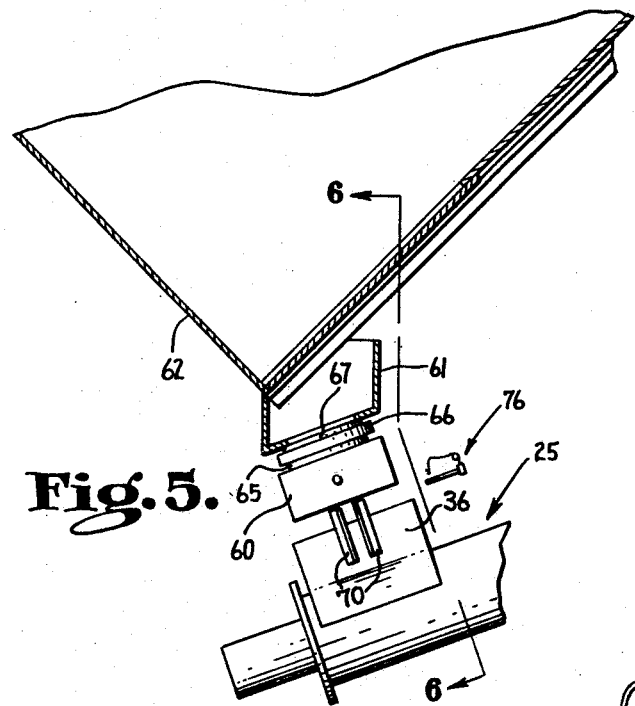
FIG. 5 is an enlarged vertical section through the gravity bed vehicle taken along the line 5—5 of FIG. 1 in the direction of the arrows with portions of the drawing shown exploded for clarity.
Figure 7:
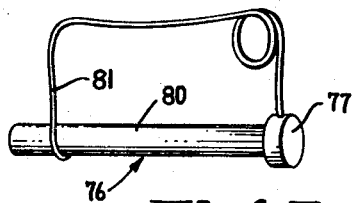
FIG. 7 is an enlarged detailed view of a fastener that might be used in the present apparatus.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a gravity bed vehicle 10 having side walls 11 which have a downward slope whereby grain and the like can move across the side walls by gravity for discharging the contents of the gravity bed vehicle. The gravity bed vehicle has an opening 12 at its lower end through which grain and the like can be discharged. This opening is controlled by a door 15 which is slideable in tracks 16 and which can be locked in position by means of the wheel 17, said position either being such that the door 15 closes off the opening 12 or that the opening 12 is open for the discharge of grain.

The gravity bed vehicle 10 further includes a frame 20 upon which the gravity bed 21 is mounted and upon which wheels 22 are mounted for moving the gravity bed vehicle from place to place. Also mounted upon the frame 20 is an auger arrangement 25 which includes a tubular housing 26. The tubular housing 26 has loops 27 thereon which can be received upon hooks 28 on the frame 20 in order to hang the housing 26 in a front-to-rear horizontally-extending position on the gravity bed vehicle for transport of the gravity bed vehicle from place to place.

The auger arrangement 25 includes an auger 30 which is received within the tubular housing 26 and is rotatable by the power of a motor 31 mounted on the housing 26 to move grain from the end portion 32 of the auger to the end portion 35 of the auger. At the end portion 32 of the auger there is mounted radially extending conduit 36 through which grain can pass into the auger arrangement 25 for movement toward the end 35. At the end 35 there is also mounted a conduit 37 which conducts grain out of the housing 26. Because the auger 25 is generally conventional, it will not be described in more detail herein.

As mentioned the auger arrangement 25 can be mounted on the gravity bed vehicle by hanging on the hooks 28. The auger arrangement 25 can also be used in connection with the gravity bed vehicle as shown in FIGS. 3 and 4. In those figures the auger arrangement 25 is in position for loading grain or the like into the gravity bed vehicle. It can be seen that the auger arrangement 25 is secured to the housing 26 thereof, the stand 40 which provides means for supporting and stabilizing the auger arrangement when it is in the position of FIGURES 3 and 4.

Swingably mounted upon one of the side walls 11 of the gravity bed vehicle is an arm 41. The arm 41 is reinforced by a brace 42 and the arm 41 is swingable by reason of a vertical pivotal connection within and about the axis of a tubular member 45. The function of the arm 41 is to support auger arrangement 25 as it is being moved to and from the position illustrated in FIGURES 3 and 4 to and from the position illustrated in FIG. 1 and also to and from the position illustrated in FIG. 2.

Mounted upon the housing 26 is a winch 50 which is conventional. The function of the winch 50 is to lock the line 51 which is wound on reel 52 of the winch in any desired position and also to provide a mechanical advantage for reeling in of the line 51 onto the reel 52. Of course, the crank 55 of the winch can also be used to slowly reel out the line 51 for lowering the auger arrangement 25. The line 51 extends through a pulley 56 mounted on the arm 41 and also extends back to a securement on the housing 26.

As mentioned, another position of the auger arrangement 25 is shown in FIG. 2 wherein the auger arrangement is illustrated as being secured to the gravity bed vehicle at the opening 12 so that grain within the gravity bed vehicle can be conveyed out of the gravity bed vehicle through the auger arrangement for discharge through the conduit 37 at any desired point. It will be noted from the dotted line positions of the auger in FIG. 1 that the arm 41 permits swinging of the auger arrangement 25 to a number of various positions. Furthermore, the loose connection of the conduit 36 to the gravity bed vehicle at the opening 12 permits a certain amount of up and down adjustable movement of auger arrangement 25 also which can be effected by reeling in or reeling out of the winch 50.

Figure 6:
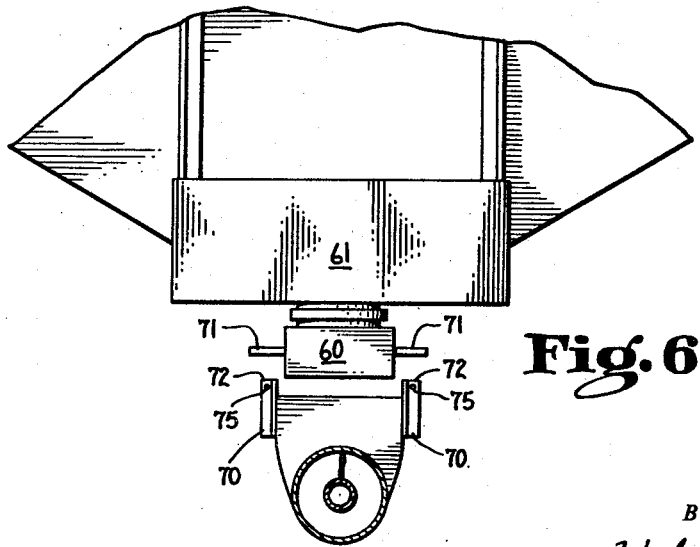
FIG. 6 is a side view of the structure of FIG. 5.

Referring more particularly to FIGURES 5 and 6, the auger arrangement 25 is secureable to a square shaped conduit 60 which is in turn secured for pivoting to a box or conduit 61 fixed to the lower portion 62 of the gravity bed vehicle 10 for guiding flow of the grain through the opening 12. The conduit 60 includes a cylindrically external portion 65 which has a flange (not shown) rotatably received within an annular member 66 which is clamped about a flanged cylindrical conduit 67 projecting from the lower end of the box like conduit 61. Thus, the conduit 60 is rotatable relative to the conduit 67 and the box 61.

FIGURES 5 and 6 show the manner in which the conduit 36 is secured to the conduit 60. Thus, the conduit 36 has on both sides thereof a pair of angles 70. Also the conduit 60 has a pair of oppositely projecting members 71 which are straddled by the angles 70. At the upper ends 72 of the angle 70 there is provided an opening 75 through which is projected the bolt 76. The bolt 76 has a head 77 and a shank 80. The shank 80 is retained in position through the angles 70 by means of a spring retainer 81 which connects to the shank 80 and has its other end fixed to the head 77. It will be noted that the size of the conduit 36 is somewhat larger than the size of a conduit 60 so as to provide a loose connection which permits raising and lowering of the auger arrangement 25 by means of the winch 50.

When the auger arrangement 25 is removed from the gravity bed vehicle and no longer attached thereto and is moved to the position of FIGURE 3, a hopper 90 can be mounted on the conduit 36 in similar fashion to the mounting of the conduit 36 to the conduit 60 at the bottom of the gravity bed vehicle. The hopper 90 which is open at its upper and lower ends provides a larger receptacle to permit the reception of flow from a source of grain or to permit the shoveling of grain or the like into the hopper 90.

It will be evident from the above description that the present invention provides an improved combination gravity bed vehicle auger arrangement. It can also be seen that the present invention provides a combination gravity bed vehicle auger arrangement which can be easily transported from place to place. It will be further evident that the present invention provides a gravity bed vehicle incorporating a relatively long auger which can be used to load or unload the vehicle or can be transported easily and conveniently from place to place.

The invention claimed is:

1. In combination with a gravity bed vehicle, said vehicle having side walls which have a downward slope whereby grain and the like can move across said side walls by gravity, said side walls having an opening at the lower portion thereof, the improvement which comprises a tubular housing having a first end portion and a second end portion, an auger in said tubular housing, means for rotating said auger in said housing for moving grain and the like through said tubular housing from said first end portion to said second end portion, means swingingly and flexibly connecting said housing centrally of the length thereof to said gravity bed vehicle above said opening, said housing being adapted for connection at said first end portion to said vehicle at said opening for conveying grain and the like out of said gravity bed vehicle and upwardly, said housing being swingable relative to said gravity bed vehicle to a position wherein said second end portion is positioned above said vehicle for discharge into said vehicle, means for connecting said housing to said vehicle at said opening and including an annular element rotatably mounted on said vehicle over said opening and providing a passageway leading from said gravity bed vehicle, a first conduit fixed to said annular element and defining a further portion of said passageway, a second conduit fixed to said housing and leading into said housing, and means for securing said conduits in telescoping relation for causing said passageway to provide communication between said vehicle and said housing, said housing being swingable by reason of its swingable and flexible connection to said vehicle and because of the rotatable mounting of said annular element on said vehicle to permit moving said second end portion to various positions.

2. The apparatus of claim 1 additionally comprising a stand secured to said housing at said first end portion and adapted to support said housing when said second end portion is positioned above said vehicle for discharge into said vehicle, a hopper, means for securing said hopper to said second conduit for use of said hopper when said second end portion is positioned above said vehicle.

3. The apparatus of claim 2 additionally comprising means for securing said housing to said vehicle with said housing extending horizontally and longitudinally of said vehicle for travel.

4. The apparatus of claim 3 wherein said means swingingly and flexibly connecting said housing comprises an arm pivotally secured to said vehicle for pivoting about a vertical axis, a winch mounted on said housing centrally of the length thereof, a flexible line on said winch and connecting said housing and said arm, said winch being operable to raise and lower said housing relative to said arm.

5. In combination with a gravity bed vehicle, said vehicle having side walls which have a downward slope whereby grain and the like can move across said side walls by gravity, said side walls having an opening at the lower portion thereof, the improvement which comprises a tubular housing having a first end portion and a second end portion, an auger in said tubular housing, means for rotating said auger in said housing for moving grain and the like through said tubular housing from said first end portion to said second end portion, means swingingly and flexibly hanging said housing centrally of the length thereof to said gravity bed vehicle above said opening, readily disconnectable means connecting at said first end portion to said vehicle at said opening for conveying grain and the like out of said gravity bed vehicle to said second end portion, said housing being disconnectable from said vehicle and swingable relative to said gravity bed vehicle to a position wherein said first end portion is removed from said opening and said second end portion is positioned above said vehicle for discharge into said vehicle, and a hopper having an open bottom and adapted to be mounted on said housing at said first end portion whereby said auger may be selectively used for loading and unloading said gravity bed vehicle.

6. The apparatus of claim 5 wherein said means swingingly and flexibly hanging said housing comprises an arm pivotally secured to said vehicle for pivoting about a vertical axis, a winch mounted on said housing centrally of the length thereof, a flexible line on said winch and connecting said housing and said arm, said winch being operable to raise and lower said housing relative to said arm.

References Cited
UNITED STATES PATENTS

| | | | |
|---|---|---|---|
| 1,398,649 | 11/1921 | Richards | 214—83.26 XR |
| 3,265,253 | 8/1966 | Niewold | 214—83.26 XR |
| 3,326,397 | 6/1967 | Lippmann et al. | 214—83.26 |
| 3,342,355 | 9/1967 | Lasiter | 214—83.26 |
| 3,391,778 | 7/1968 | Lasiter | 214—83.26 XR |

FOREIGN PATENTS 915,027   1/1963   Great Britain.

ALBERT J. MAKAY, Primary Examiner

U.S. Cl. X.R.

198—126